United States Patent

[11] 3,592,159

| [72] | Inventor | Robert Murphy |
| | | Robinson, Ill. |
| [21] | Appl. No. | 777,563 |
| [22] | Filed | Nov. 21, 1968 |
| [45] | Patented | July 13, 1971 |
| [73] | Assignee | L. S. Heath & Sons, Inc. |
| | | Robinson, Ill. |

[54] LIQUID LEVEL CONTROL
4 Claims, 4 Drawing Figs.

[52] U.S. Cl. .................................................. 118/7,
137/403, 137/563, 137/334
[51] Int. Cl. ............................................... B05c 11/10
[50] Field of Search ........................................ 137/386,
403, 563, 334; 73/302; 118/7, 30

[56] References Cited
UNITED STATES PATENTS

| 2,244,686 | 6/1941 | Garrison | 137/563 X |
| 2,516,884 | 8/1950 | Kyame | 137/563 X |
| 3,085,672 | 10/1962 | Zabel | 137/403 X |
| 3,200,971 | 8/1965 | Trethewey | 137/403 X |
| 3,433,249 | 3/1969 | Nelson | 137/403 |
| 1,789,166 | 1/1931 | Bandemer | 73/302 |

Primary Examiner—Alan Cohan
Attorneys—A. Yates Dowell and A. Yates Dowell, Jr.

ABSTRACT: A level control for the chocolate supply in an enrober has a fast-cycling makeup controlled by an air tube applied to the surface of the chocolate so that slight lowering of the surface operates the makeup control.

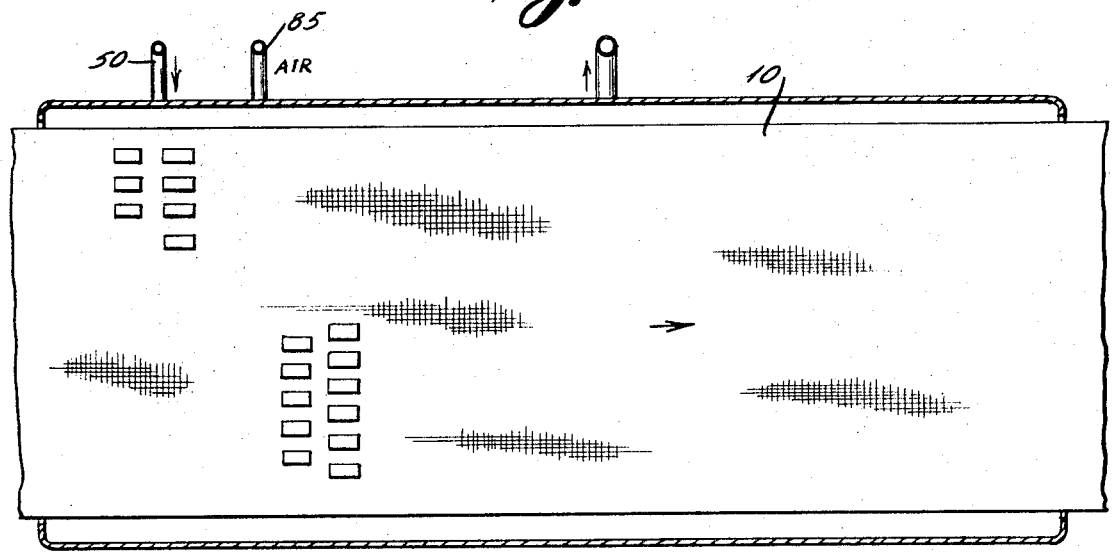
Fig. 2
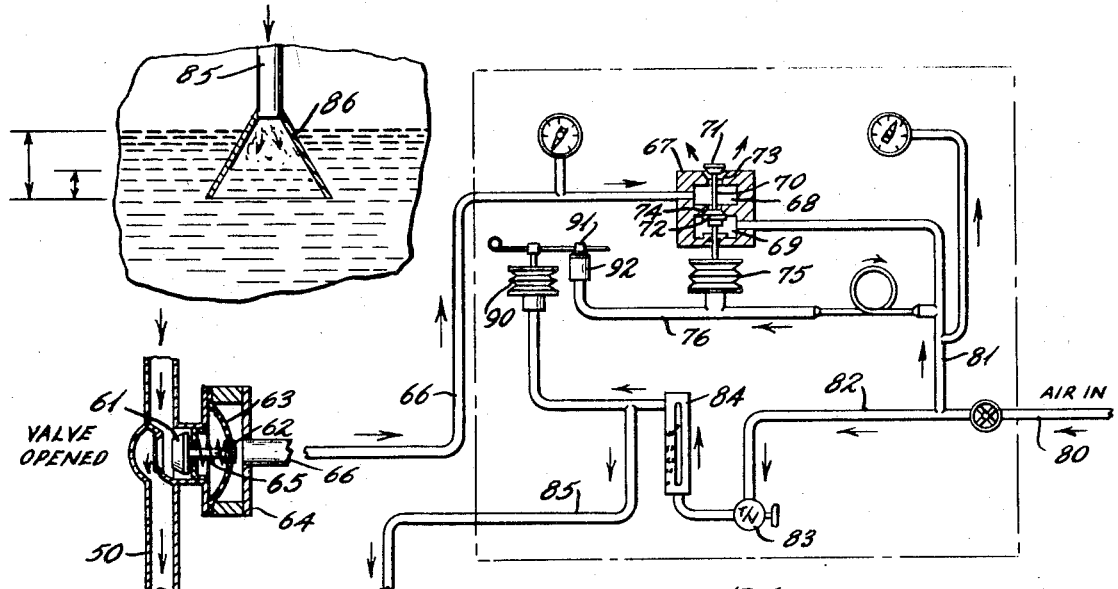
Fig. 3
Fig. 4
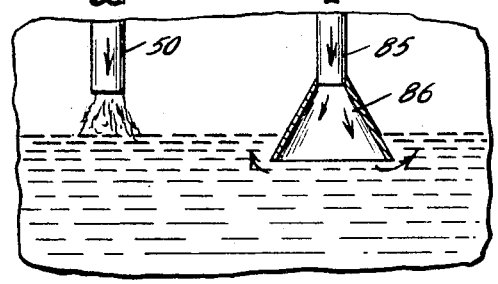
INVENTOR
ROBERT MURPHY
ATTORNEYS

LIQUID LEVEL CONTROL

BACKGROUND OF THE INVENTION

The invention relates to liquid or fluid controls and more particularly to those for replenishing a supply of a consumed commodity. Such controls have been used in many areas and have generally been of a relatively simple type responsive to the action of a float or the like. Such controls meet many needs where the only requirement is maintaining an approximate level or quantity of the commodity. However, in the manufacture of confectionery, particularly in the enrobing of candy bars with chocolate, there is a requirement that the consistency including the temperature and viscosity of the chocolate have a high degree of uniformity at all times in order to produce a uniform product. The makeup or introduction from a source of supply of chocolate to the enrobing supply presents the possibility of altering the nature of the chocolate. This is more likely when the quantity of makeup is large and is less likely if the increments of makeup are small. Since the consumption of chocolate is not uniform at all times, it is necessary to provide a makeup control which is responsive to the consumption.

SUMMARY OF THE INVENTION

The present invention is embodied in apparatus for maintaining a substantially constant level of chocolate or other liquid by replenishing the supply in small increments, which during normal operation occurs at frequent intervals of time. This is accomplished by employing a control with an air pressure applicator and an inverted funnel which extends down into the chocolate and through which air pressure is applied. When the level drops slightly, the air pressure is relieved and through control means opens an inlet valve for the chocolate, the inlet valve closing as soon as the level is restored.

DESCRIPTION OF THE PREFERRED EMBODIMENT

Figure 1:
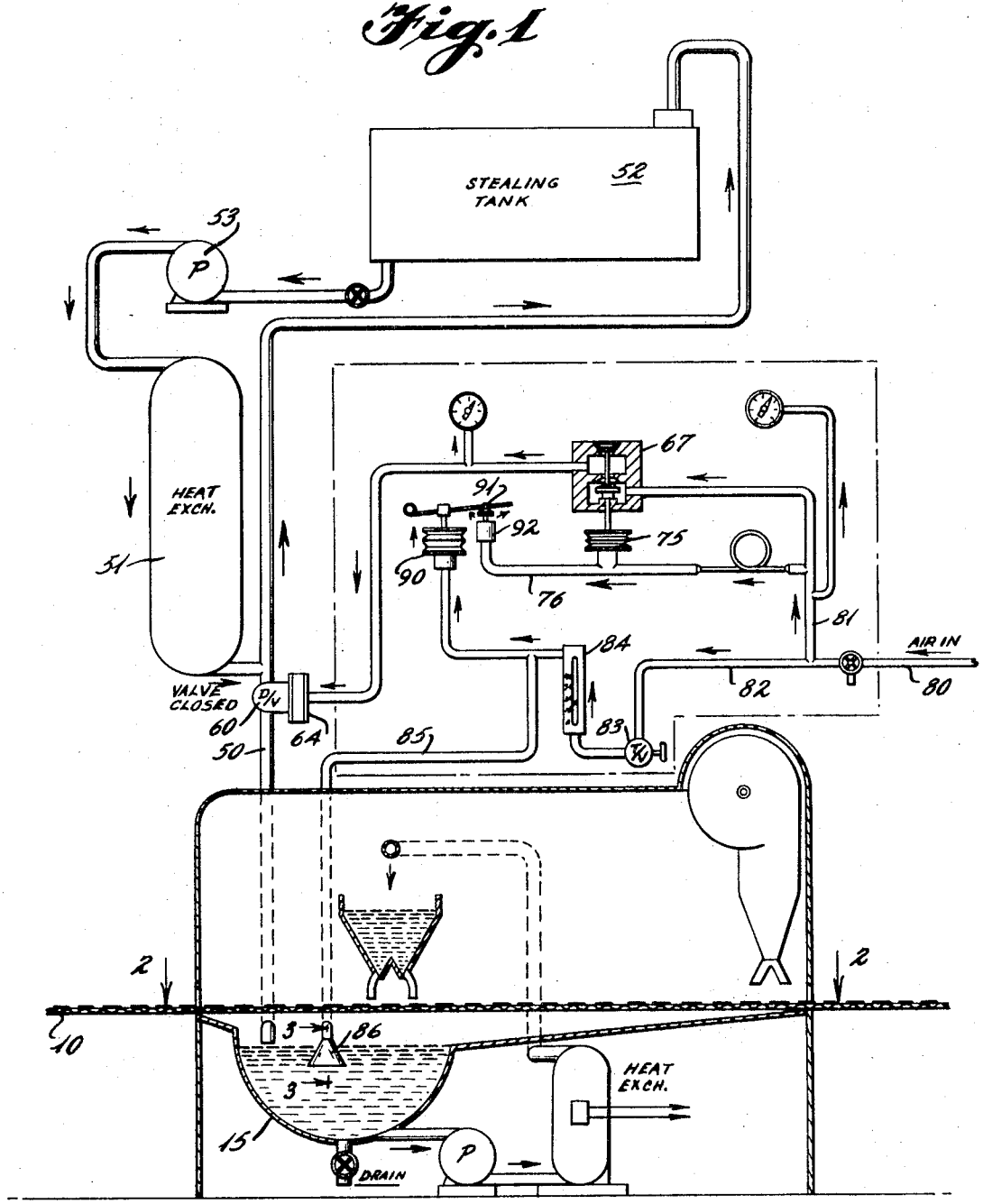

In the accompanying Drawings:

FIG. 1 is a schematic layout of enrobing apparatus illustrating the use of the embodiment of the present invention;

FIG. 2, a section on the line 2-2 of FIG. 1;

FIG. 3, an enlarged section on the line 3-3 of FIG. 1; and

FIG. 4, an enlarged layout with portions in section of the invention.

With further reference to the drawings, there is illustrated a candy-processing line including a conveyor 10 which in the illustration runs from left-to-right. The conveyor has placed on it at spaced positions candy centers such as toffee pieces 11, which pass beneath an enrober or hopper 12. The enrober discharges chocolate in streams or curtains from outlets 13 and 14, the centers passing through the curtains and becoming covered with the chocolate. The conveyor 10 is formed of mesh, which permits running off of excess chocolate from the centers and through the mesh back into a vat 15.

The chocolate partially solidifies as the conveyor moves and is subjected to a stream of air under pressure from a blower 16 in order to further solidify the chocolate coating as well as to blow excess chocolate from the centers and the mesh conveyor onto a drain pan 17 so that such chocolate will flow by gravity back to the vat 15. The chocolate in the vat 15 is continually recirculated by pump 20 through a thermostatically controlled heat exchanger 21 for maintaining the appropriate temperature and through piping 22 back to the enrober 12 from which it flows by gravity onto the conveyor.

In order that the vat 15 may be replenished, the present invention provides a control for maintaining the supply substantially constant. The control includes a device for applying air pressure to a substantial area within the vat, an inverted funnel having been found to perform satisfactorily. The funnel may be of appropriate size, such as 6 inches in diameter at the large end or mouth, and is mounted to extend downwardly into the chocolate a distance of from 1 inch to approximately 18 inches depending upon the air pressure, consistency of the chocolate, and the like.

Chocolate to the line 50 passes through heat exchanger 51, being drawn from tank or reservoir 52 by pump 53. The tank is of considerably greater capacity than the vat 15 and has its supply replenished from time to time.

In order to maintain a substantially constant level of chocolate in vat 15, control means is provided for supplying chocolate to the vat in small increments as it is used. With particular reference to FIGS. 1 and 4, chocolate supply line 50 has valve 60 controlling the supply of chocolate to the vat 15. Valve 60 has valve member 61 with shaft 62 which engages diaphragm 63 within housing 64. Spring 65 around shaft 62 tends to open the valve which is closed against the spring if the pressure within housing 64 is adequate.

Housing 64 is connected by line 66 to valve 67 having recesses 68 and 69. The valve has an operating member with shaft 70 and valve members 71, 72 which may seat in valve openings 73, 74 alternately and respectively, the shaft being connected to bellows 75 which communicates with line 76.

When valve member 71 is in the position indicated in FIG. 4, pressure is relieved in line 66 thereby permitting opening of valve 61 to permit chocolate to enter the vat. However, when valve member 71 is in the position indicated in FIG. 1 air enters through main supply line 80, branch line 81 to recess 69, through openings 74 into line 66 and is of sufficient pressure to overcome spring 65 thereby closing valve 60.

The position of the operating member for valve numbers 71, 72 is controlled by the level of chocolate in vat 15 as will be described. Air from line 80 passes into branch line 82 through valve 83 and indicator 84 to line 85 to funnel 86. The funnel 86 is inverted and positioned beneath the surface of the chocolate an appropriate distance, e.g. the range of approximately 1 inch to 18 inches, depending upon the air pressure and consistency of the chocolate. The large end of the funnel may be on the order of 6 inches in diameter. In one embodiment air of approximately 19 p.s.i. is supplied to the funnel. Branch line 82 is connected to bellows 90 which tends to lift valve member 91 from its seat 92.

As illustrated in FIG. 4, when the chocolate level has dropped sufficiently to permit air to escape from beneath the funnel 86 pressure does not build up in bellows 90 sufficiently to unseat valve 91. In the seated position valve 91 permits the build up of pressure in bellows 75 causing valve member 72 to close and valve member 71 to open and permitting opening of valve 60 for supply of chocolate.

On the other hand as indicated in FIG. 1, when the level of chocolate is adequate air no longer escapes beneath the funnel 86 and thus causes a build up of pressure in bellows 90 thereby unseating pilot valve 91 and permitting relief of pressure in line 76 thereby permitting the collapsing of normally closed bellows 75 and closing valve member 71 and opening valve member 72 thereby permitting communication of supply air with the interior of the housing 64 and closing valve 60.

The control mechanism is constructed and arranged so that during normal operation makeup to the vat 15 occurs approximately every 10 seconds. Due to the frequency and small quantity of the increments, compared with the quantity that is constantly circulating in the enrobing apparatus, the uniformity of the chocolate therein is maintained at a high level thereby assuring a uniform product.

In the operation of the device a predetermined amount of chocolate in liquid form is placed within the vat 15 from which it is pumped through the heat exchanger 21 to the enrober or hopper 12. From the hopper the chocolate flows by gravity through outlets 13 and 14 to coat the candy centers 11 as the conveyor 10 moves such centers beneath the hopper. Excess chocolate falls by gravity from the conveyor into the vat 15 or onto the drain pan 17. The level of chocolate is maintained in the vat by the control means already described.

What I claim is:

1. The combination of a liquid heating and recirculating system for supplying heated liquid to a tank from which liquid is removed at a variable rate and in which the liquid is maintained at a substantially constant level comprising a reservoir in which liquid is to be placed, a heat exchanger connected to said reservoir by liquid conduits, pump means for circulating liquid from said reservoir through said heat exchanger and back to said reservoir, a holding tank, a liquid line connecting one of said liquid conduits with said holding tank, a liquid dispenser located above said holding tank, a second liquid line connecting said holding tank and said dispenser, pump means in said second liquid line for transferring liquid from said holding tank to said dispenser, liquid level control means for controlling the liquid level within said holding tank, said control means including a pressure head means located at a predetermined depth below the liquid level in said holding tank, a first air line for introducing air under a constant pressure into said pressure head means, a pressure operated supply valve located in said first liquid line intermediate said reservoir and said holding tank, a multichamber valve member having first and second chambers, a first opening providing communication between said first and second chambers, a second opening providing communication between said second chamber and the atmosphere, means for alternately closing said openings, a second air line connecting said pressure operated supply valve to said second chamber, a third air line for introducing air under constant pressure into said first chamber, relief valve means connected to said first air line and adapted to operate said means for alternately closing said openings, whereby when the air pressure within said pressure head is greater than the liquid head within the holding tank air will escape from said pressure head and reduce the pressure in said relief valve means and operate said means for alternately closing the openings of said multichamber valve member to close said first opening and open said second opening to exhaust air pressure from the supply valve means to the atmosphere and open said supply valve means to permit liquid to flow from said reservoir to said holding tank and raise the liquid level therein until air no longer escapes from said pressure head after which said relief valve means will operate the means for alternately closing said openings to open said first opening and close said second opening and introduce air under pressure from said first chamber into said supply valve means to close the same and interrupt the flow of liquid through said first liquid pipe.

2. The structure of claim 1 including conveyor means located between said liquid dispenser and said holding tank, said conveyor means adapted to support objects to be coated by liquid from said liquid dispenser and means for returning excess liquid to said holding tank.

3. The structure of claim 1 including a second heat exchanger mounted in said second liquid line intermediate said holding tank and said dispenser for maintaining the liquid in said holding tank at a predetermined temperature.

4. The structure of claim 1 in which said liquid includes chocolate for enrobing pieces of candy.